United States Patent [19]

Kume et al.

[11] Patent Number: 5,541,899
[45] Date of Patent: Jul. 30, 1996

[54] OPTICAL PICKUP DEVICE WITH MOVABLE OBJECTIVE LENS AND STATIONARY FOCUSING AND TRACKING COILS

[75] Inventors: Hidehiro Kume; Koji Mitsumori; Tomoyuki Ishida, all of Tokyo, Japan

[73] Assignee: Sony Corporation, Tokyo, Japan

[21] Appl. No.: 415,086

[22] Filed: Mar. 31, 1995

Related U.S. Application Data

[63] Continuation of Ser. No. 236,233, May 2, 1994, abandoned, which is a continuation of Ser. No. 23,490, Feb. 25, 1993, abandoned, which is a continuation of Ser. No. 583,594, Sep. 17, 1990, abandoned.

[30] Foreign Application Priority Data

Sep. 18, 1989 [JP] Japan ................................. 1-241394

[51] Int. Cl.$^6$ ................................................. G11B 7/00
[52] U.S. Cl. ................................. 369/44.14; 369/44.21
[58] Field of Search ........................... 369/44.14, 44.15, 369/44.16, 44.11, 44.22, 44.21, 244; 359/824, 823, 814, 813

[56] References Cited

U.S. PATENT DOCUMENTS

| | | | |
|---|---|---|---|
| 4,507,764 | 3/1985 | Musha | 369/44.16 |
| 4,766,583 | 8/1988 | Oinoue et al. | 369/44.16 |
| 4,794,580 | 12/1988 | Ikedo et al. | 369/44.16 |
| 4,818,066 | 4/1989 | Nose | 369/44.16 |
| 4,958,335 | 9/1990 | Takeda et al. | 369/44.14 |
| 4,962,999 | 10/1990 | Kasuga | 369/44.11 |
| 4,984,226 | 1/1991 | Kobori | 369/44.22 |
| 4,998,802 | 3/1991 | Kasuga et al. | 369/44.22 |
| 5,005,162 | 4/1991 | Mitsumori et al. | 369/112 |
| 5,056,891 | 10/1991 | Masunaga | 358/823 |
| 5,103,438 | 4/1992 | Masunaga et al. | 359/823 |
| 5,110,246 | 4/1991 | Tsuyuguchi et al. | 369/112 |
| 5,136,558 | 8/1992 | Getreuer et al. | 369/44.15 |
| 5,144,607 | 9/1992 | Ishida et al. | 369/44.15 |

FOREIGN PATENT DOCUMENTS

| | | |
|---|---|---|
| 0358294 | 3/1990 | European Pat. Off. . |
| 2455331 | 11/1980 | France . |
| 121140 | 5/1988 | Japan ................. 369/44.14 |
| 112830 | 5/1988 | Japan ................. 369/44.14 |
| 2052829 | 1/1981 | United Kingdom . |

*Primary Examiner*—Nabil Z. Hindi
*Attorney, Agent, or Firm*—Jay H. Maioli

[57] ABSTRACT

An objective lens drive device has a supporting member to which an objective lens is attached. The supporting member is freely translated in a direction parallel to the optical axis of the objective lens and in a plane perpendicular to the optical axis. The supporting member is attached a stationary portion, and a magnetic circuit provided on the supporting member forms a closed magnetic path. A focusing coil and a plurality of tracking coils attached to the focusing coil drive the objective lens in cooperation with the magnetic circuit so that the objective lens is translated in the direction parallel to the optical axis and in the direction perpendicular to the optical axis. The focusing coil and the tracking coils are mounted on the stationary portion so as to oppose the magnetic circuit with a predetermined spacing therebetween.

4 Claims, 7 Drawing Sheets

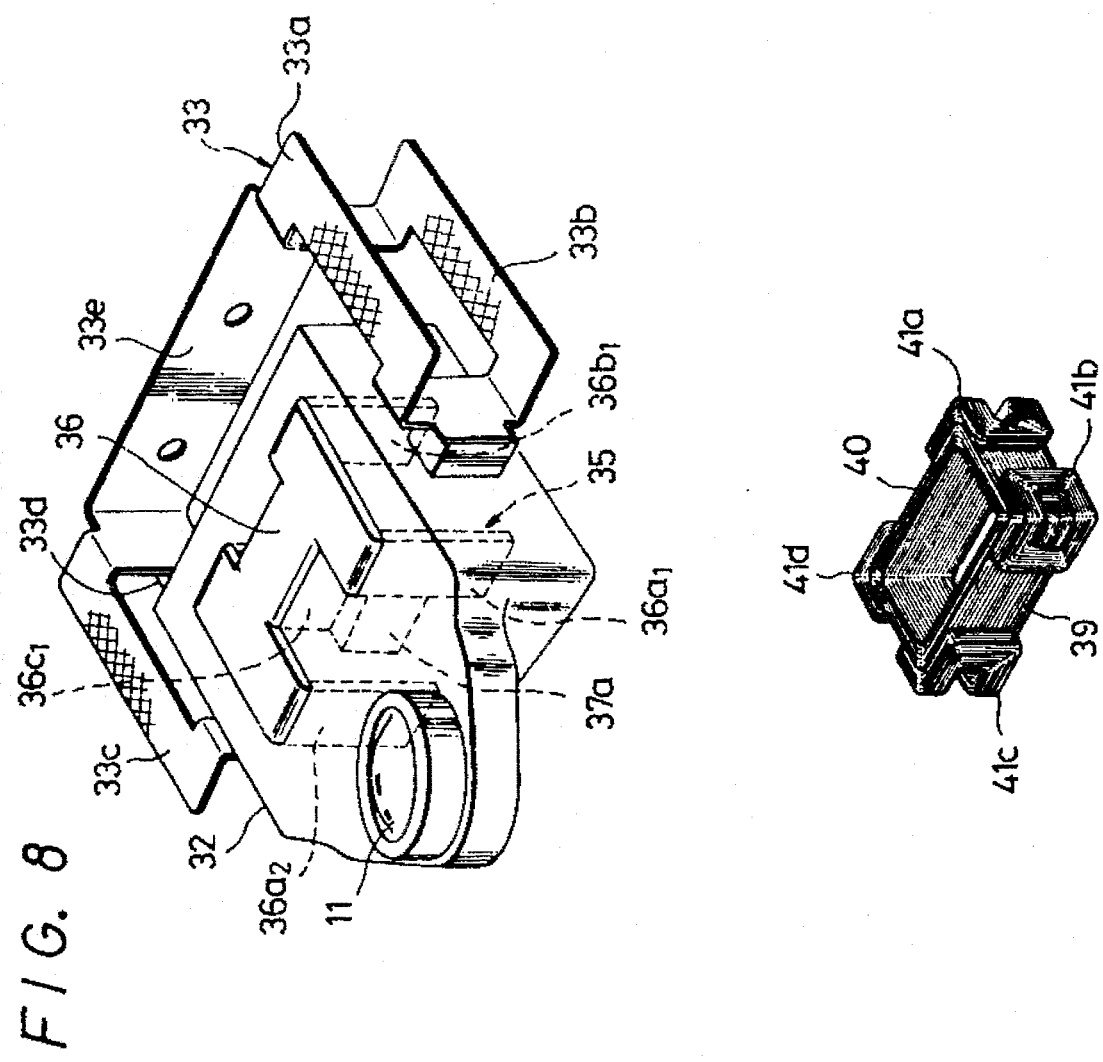

OPTICAL PICKUP DEVICE WITH MOVABLE OBJECTIVE LENS AND STATIONARY FOCUSING AND TRACKING COILS

This is a continuation of application Ser. No. 08/236,233, filed May 2, 1994, now abandoned, of grandparent application Ser. No. 08/023,490, filed Feb. 25, 1993, now abandoned, and of great-grandparent application Ser. No. 07/583,594, filed Sep. 17, 1990, now abandoned.

BACKGROUND OF THE INVENTION

1. Field of the Invention

The present invention generally relates to optical pickup devices and, more particularly, is directed to an optical pickup device which drives and displaces in the focusing and tracking directions or in either of these focusing and tracking directions an objective lens which converges a laser beam emitted from a laser light source on a signal recording surface of an optical disc.

2. Description of the Prior Art

An optical pickup device is known as a device for reading an information signal recorded on an optical disc or recording a predetermined information signal on an optical disc by irradiating a laser beam on a signal recording surface of the optical disc which is revolved by a disc drive device. This known optical pickup device is provided with an objective lens drive device. The objective lens drive device drives and displaces in the focusing direction and in the tracking direction or in any one of these focusing and tracking directions an objective lens, which converges a laser beam emitted from a semiconductor laser provided as a laser light source on the signal recording surface of an optical disc, by a magnetic drive force so that the laser beam is focused on the signal recording surface of the optical disc thereby accurately scanning recorded tracks formed on the optical disc.

FIG. 1 shows an example of an objective lens drive device which is applied to the prior-art optical pickup device.

As FIG. 1 shows, an objective lens 1 is supported on a bobbin 4, and a focus control drive coil 2 and a tracking control drive coil 3 are attached to the bobbin 4. The bobbin 4 is located between magnets 6, 6 which are provided on a base plate 5 in an opposing relation. The bobbin 4 is supported on the base plate 5 in a cantilever fashion by a pair of supporting rods made of elastic metal and which are extended between front left and right portions of an attaching plate 7 erected on the base plate 5 in parallel to each other.

According to the thus arranged objective lens drive device, when a drive current is supplied to the focus control drive coil 2 or to the tracking control drive coil 3, the bobbin 4 is moved by the elastic displacement of supporting rods 8, whereby an objective lens 11 supported on the bobbin 4 is moved in the focusing direction and in the tracking direction.

In the prior-art objective lens drive device thus constructed, the focusing coil and the tracking coil are mounted on the movable side bobbin which supports thereon the lens system. There is then the substantial disadvantage that the optical characteristic of a lens, especially a plastic lens, will deteriorated because of the heat generated by the coils or that, when the coils are deformed by heat, this will hinder the movement of the bobbin.

Further, the bobbin needs a feeding flexible printed circuit board or the like to be connected to the coils, which unavoidably increases the number of assembly parts. Furthermore, although the movable side bobbin is made as small as possible in order to reduce the weight thereof, the soldering of the flexible printed circuit board to the end of the coil at such small area is very difficult, and the number of assembly processes for connecting the printed circuit board in the base plate side is increased.

In addition, the coils of different shapes are used and many soldering lands are used so that the gravity center of the movable portion cannot be selected with sufficiently high accuracy. Consequently, this requires the inspection and sometimes the repair or replacement of the objective lens drive device. Further, after the assembly-process, the prior-art objective lens drive device is unavoidably affected from a characteristic standpoint.

OBJECTS AND SUMMARY OF THE INVENTION

Accordingly, it is a general object of the present invention to provide an improved objective lens drive device that can eliminate the aforenoted shortcomings and disadvantages encountered with the prior art.

More specifically, it is an object of the present invention to provide an objective lens drive device which can be simplified in construction.

Another object of the present invention is to provide an objective lens drive device in which an objective lens can be prevented from being affected by heat generated from focusing and tracking coils.

Still another object of the present invention is to provide an objective lens drive device in which focusing and tracking controls of a laser beam by an objective lens can always be carried out accurately.

A further object of the present invention is to provide an objective lens drive device in which the number of assembly parts can be reduced considerably.

Yet a further object of the present invention is to provide an objective lens drive device in which the number of assembly processes can be reduced considerably.

Still a further object of the present invention is to provide an objective lens drive device which can reduce the manufacturing cost thereof.

An additional object of the present invention is to provide an objective lens drive device which is suitable in the application to an optical pickup device of an optical disc recording and/or reproducing apparatus.

As an aspect of the present invention, an objective lens drive device comprises a supporting member having an objective lens attached thereto and being supported so that the supporting member can be translated in the direction parallel to the optical axis direction of the objective lens and in the plane direction perpendicular to the optical axis direction, a magnetic circuit provided on the supporting member to form a closed magnetic path, a focusing coil for moving the objective lens in the direction parallel to the optical axis direction in cooperation with the magnetic circuit, and a tracking coil for moving the objective lens in the plane direction perpendicular to the optical axis direction in cooperation with the magnetic circuit, wherein the focusing coil and the tracking coil are opposed to each other with a predetermined spacing relative to the magnetic circuit.

The preceding, and other objects, features and advantages of the present invention will be apparent in the following

BRIEF DESCRIPTION OF THE DRAWINGS

FIG. 8 is a perspective view illustrating a third embodiment of the objective lens drive device according to the present invention;

FIG. 9 is an exploded perspective view of the yoke used in the third embodiment of the present invention;

DETAILED DESCRIPTION OF THE PREFERRED EMBODIMENTS

Figure 1:
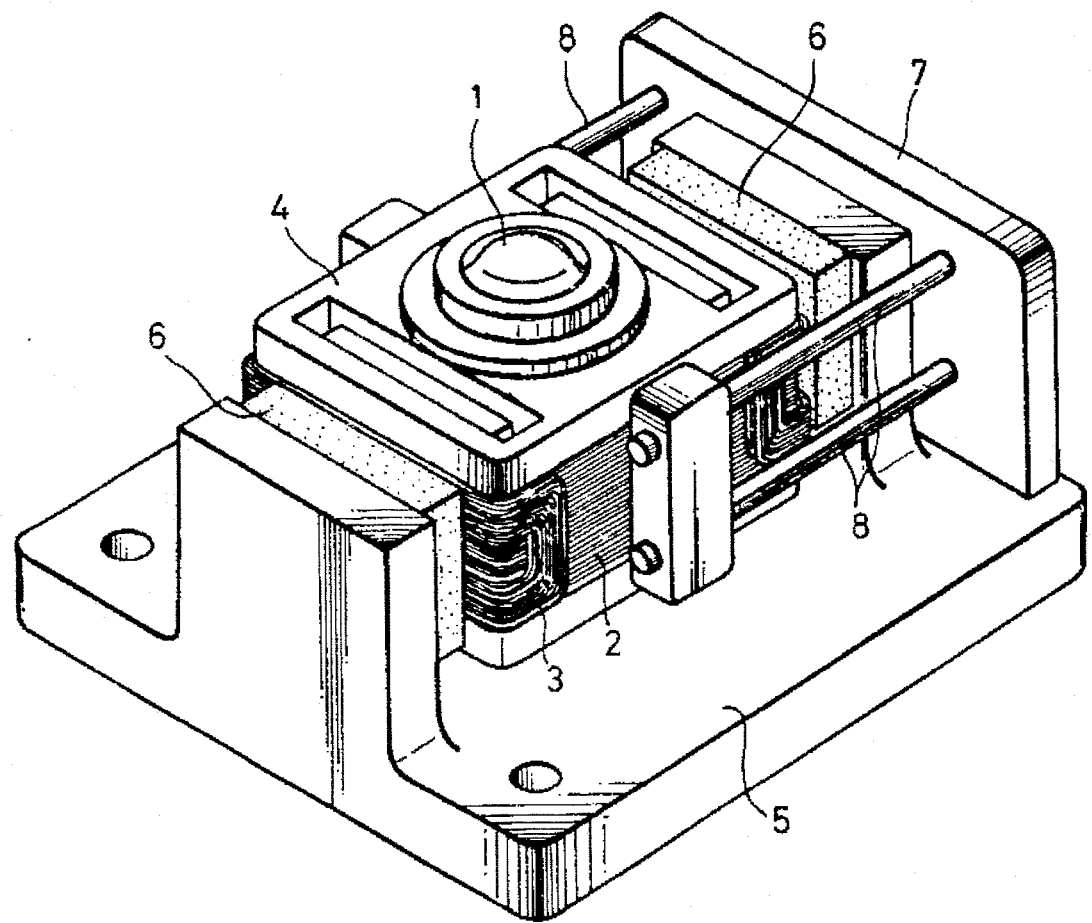
FIG. 1 is a perspective view illustrating an example of a prior-art objective lens drive device.

Referring to the drawings in detail, and initially to FIGS. 2 to 4, a first embodiment of the objective lens drive device according to the present invention will be described hereinafter. In this embodiment, the objective lens drive device of the invention is applied to an optical pickup device.

As illustrated, an objective lens 11 is mounted on a supporting member 12, and this supporting member 12 is supported by a movable supporting member 13 so that it can be moved in the up and down direction and in the lateral direction, i.e., in the direction parallel to the optical axis of the objective lens 11 relative to a base plate 14 and in the direction perpendicular to the optical axis of the objective lens 11. For simplicity, the former direction will be referred to hereinafter as "focusing direction" and the latter direction will be referred to hereinafter as "tracking direction".

The supporting member 12 is divided at the rear side of a lens attaching portion 12a thereof to provide a pair of arm portions 12b and 12c, and the supporting member 13 is inserted between the arm portions 12b and 12c and is secured thereto at the top portion thereof. The supporting member 13 has a pair of movable portions 13a, 13a, which are formed to be parallel to each other, thin hinge portions 13b, 13c and an attaching base end portion 13d. These movable portions 13a, 13a, thin hinge portions 13b, 13c and attaching base end portion 13d are integrally molded by an injection molding process of a synthetic resin. The thin hinge portion 13c is an auxiliary hinge portion, by which the supporting member 12 can be revolved with a sufficient revolution amount, when it is rotated in the tracking direction. The two arm portions 12b and 12c are provided with magnetic circuits 15a and 15b, each of which constructs a closed magnetic path. As shown in FIGS. 3 and 4, the magnetic circuits 15a and 15b are respectively formed of inverted U-letter shaped yokes 16a and 16b and magnet pieces 17a and 17b. The yokes 16a and 16b are respectively formed of L-shaped members including inside edge portions $16_{a1}$, $16_{b1}$ to which outside edge portions $16_{a2}$, $16_{b2}$ are added to form the U-shaped yokes. The yokes 16a and 16b are secured to the supporting member 12 at inside edge portions $16_{a1}$ and $16_{b1}$ thereof under the condition that the yokes 16a and 16b cross the arm portions 12a and 12c, respectively. Whereas, outside edge portions $16_{a2}$ and $16_{b2}$ of yokes 16a and 16b are spaced apart from the outside walls of the arm portions 12b and 12c with a predetermined clearance, respectively. The magnet pieces 17a and 17b are respectively secured to the lower half portions of the inside edge portions $16_{a1}$ and $16_{b1}$ with a predetermined clearance from the outside edge portions $16_{a2}$ and $16_{b2}$.

In the yokes 16a and 16b of this embodiment, the outside edge portions $16_{a2}$ and $16_{b2}$ thereof are substantially square in cross section. The widths and thicknesses thereof are substantially equal, and the cross-sectional areas thereof are made substantially equal to those of the inside edge portions $16_{a1}$ and $16_{b1}$.

A balancer 18 is mounted to the rear portion of the supporting member 12, i.e., between the rear ends of the arm portions 12b and 12c so that the supporting member 12 is stably supported by the supporting member 13 in the front to back direction.

Figure 2:
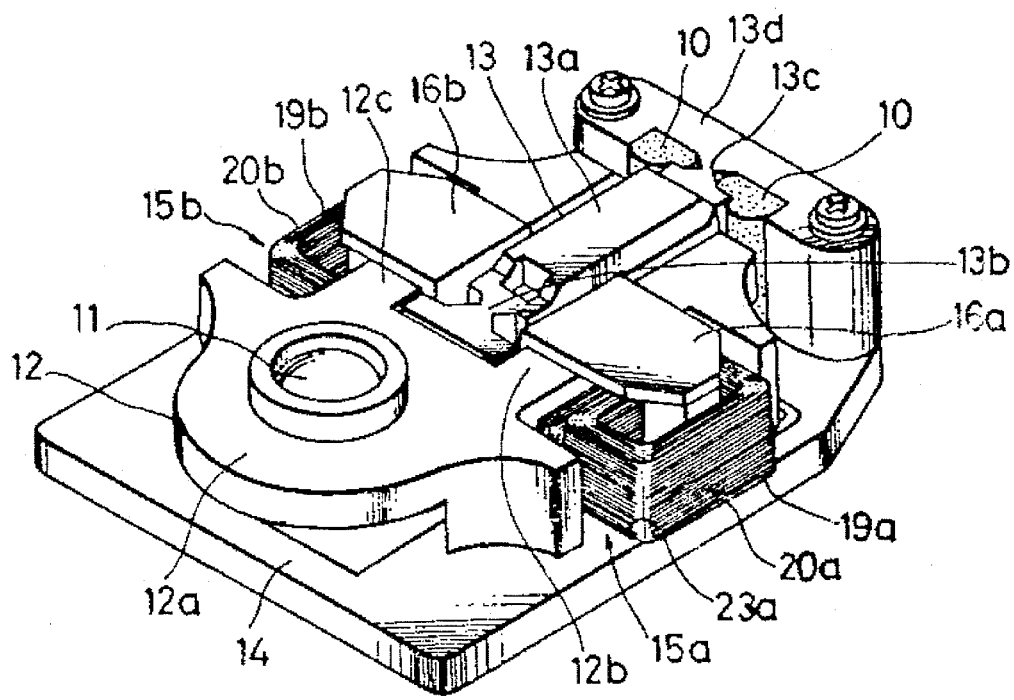
FIG. 2 is a perspective view illustrating a first embodiment of an objective lens drive device according to the present invention.
Figure 4:
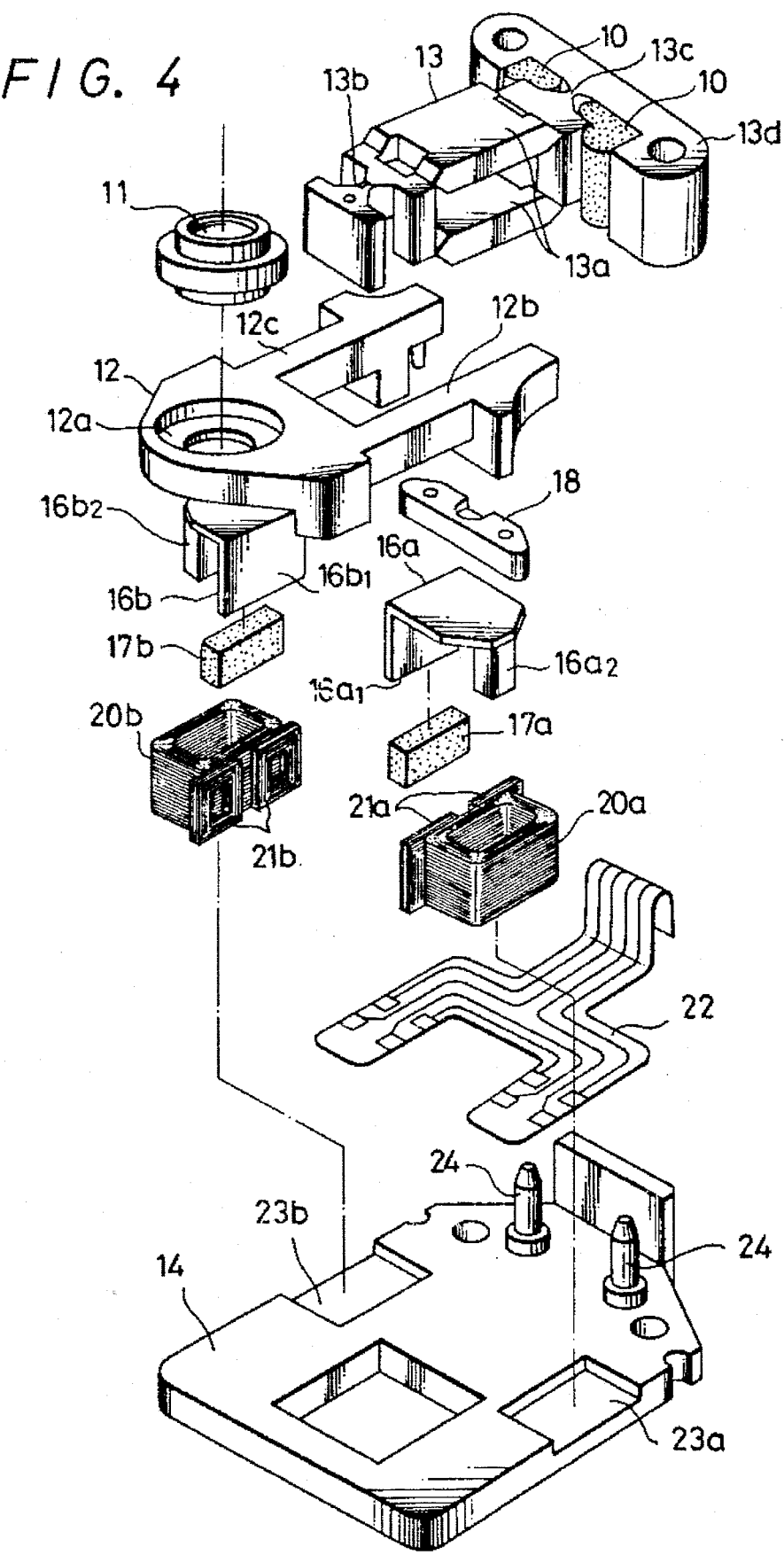
FIG. 4 is an exploded perspective view of the objective lens drive device of FIG. 1.

As shown in FIGS. 2 and 4, drive coils 19a and 19b are secured to the base plate 14 in accordance with the aforementioned magnetic circuits 15a and 15b, respectively.

The drive coils 19a and 19b are respectively constructed by coupling tracking coils 21a and 21b, each of which is formed of a pair of coils wound in substantially a square-shape, to inside surfaces of focusing coils 20a and 20b wound in a cylindrical shape. The drive coils 19a and 19b are connected to a flexible printed circuit board 22 laminated on the base plate 14 and secured thereto. The heights of the drive coils 19a and 19b are selected to be higher than those of the magnet pieces 17a and 17b. Positioning recess portions 23a and 23b are formed on the base plate 14 so as to determine the positions of the drive coils 19a and 19b. By these recess portions 23a and 23b, the drive coils 19a and 19b are accurately secured to the predetermined positions of the base plate 14. A pair of pins 24 and 24 are provided on the base plate 14 so as to mount the attaching base end portion 13d of the supporting member 13 to the base plate 14. Dampers 10 are provided in the concave portions of the attaching base end portion 13d of the supporting member 13 as shown in FIGS. 2 and 4.

The drive coils secured to the base plate 14, that is, the inside wall sides of the focusing coils 20a and 20b and the tracking coils 21a and 21b are inserted between the outside edge portions $16_{a2}$ and $16_{b2}$ of the yokes 16a and 16b of the magnetic circuits and the magnet pieces 17a and 17b with a predetermined spacing therebetween In the thus arranged objective lens drive device of this embodiment, the supporting member 12 having the objective lens 11 thereon is supported relative to the base plate 14 by the supporting member 13 so that it may be moved in the two axial directions, i.e., the focusing direction and the tracking direction. When a predetermined focusing current is applied to the focusing coils 20a and 20b of the drive coils 19a and 19b, a force in the upper to lower direction acts on the supporting member 12 in cooperation with the magnetic flux of the magnetic circuits 15a and 15b to cause the pair of movable members 13a, 13a of the supporting member 13 to be translated up and down, i.e., to cause the movable members 13a, 13a to be swung in the vertical direction, whereby the supporting member 12 is displaced in the direction parallel to the optical axis of the objective lens 11, thereby the laser beam being focused. When a predetermined tracking current is applied to the tracking coils 21a and 21b, a force in the lateral direction acts on the supporting member 12 to allow the thin hinge portion 13b to translate the supporting member 12 in the lateral direction, i.e., the movable members 13a, 13a of the supporting member 13 are swung in the horizontal direction, whereby the supporting member 12 is displaced in the direction perpendicular to the optical axis of the objective lens 11, thereby the tracking of the laser beam being performed.

The objective lens drive device of this embodiment is operated as described above. In the objective lens drive device of this embodiment, the magnetic circuits 15a and 15b are provided on the supporting member 12 and are moved relative to the drive coils 19a and 19b provided on the base plate 14. In that case, since the yokes 16a, 16b and the magnet pieces 17a, 17b forming the magnetic circuits 15a, 15b are secured to the supporting member 12, this objective lens drive device has a small mechanical fluctuation and is stably operated. Further, since the heat generated by the focusing and tracking coils 20a, 20b and 21a, 21b is radiated from the base plate 14, the objective lens 11 can be prevented from being affected by the heat.

Further, since the lead wires led out from the focusing and tracking coils 20a, 20b and 21a, 21b, or the printed circuit board 22 is secured to the base plate 14, the printed circuit board 22 can be connected to the focusing and tracking coils 20a, 20b and 21a, 21b easily and positively.

Alternatively, in this embodiment, although the outside edge portions $16_{a2}$ and $16_{b2}$ of the yokes 16a and 16b are shaped substantially as square in cross section, their shapes are not limited thereto and may be modified freely. Further, the outside edge portions $16_{a2}$ and $16_{b2}$ may be unitarily formed with the inside edge portions $16_{a1}$ and $16_{b1}$. Furthermore, magnet pieces may be attached to the outside edge portions $16_{a2}$, $16_{b2}$. In addition, the supporting member 12 may be made of various kinds of materials so long as they are non-magnetic materials. In particular, it is preferable that the supporting member 12 be made of a light weight non-magnetic material.

Figure 5:
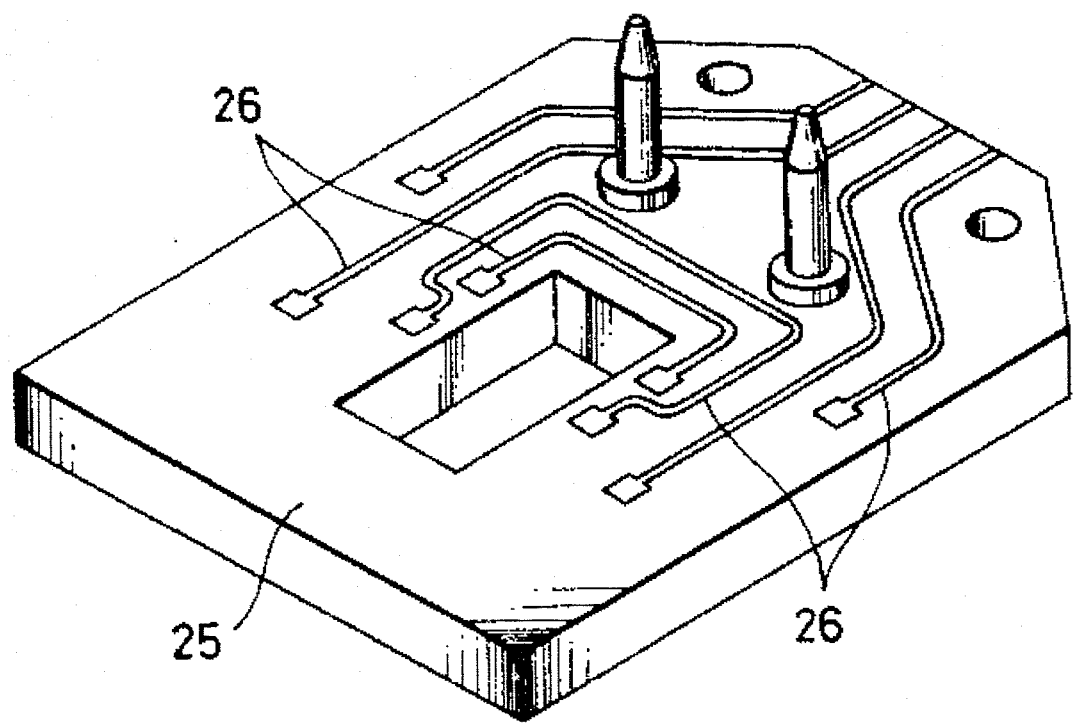
FIG. 5 is a perspective view illustrating another example of the base plate used in the present invention.

FIG. 5 shows a perspective view of another example of a base plate of the objective lens drive device of the present invention.

As shown in FIG. 5, a base plate 25 is constructed by a printed circuit board in which wiring patterns 26 are formed on, for example, a glass epoxy resin substrate. According to this example, the aforementioned focusing and tracking coils are connected to the lead wires only by securing the focusing and tracking coils to the base plate 25 so that the number of assembly steps in the process can be reduced more.

Figure 6:
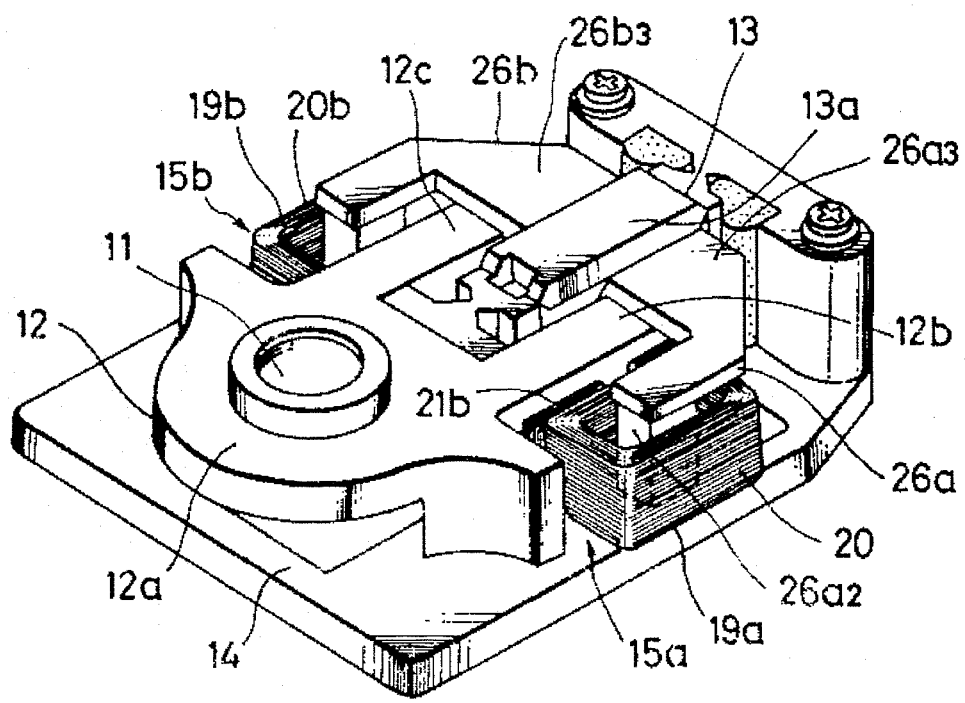
FIG. 6 is a perspective view illustrating a second embodiment of the objective lens drive device according to the present invention.
Figure 7:
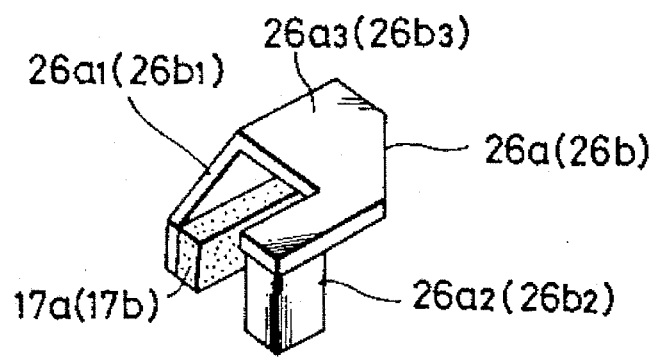
FIG. 7 is a perspective view of the yoke used in the second embodiment of the present invention.

A second embodiment of the objective lens drive device according to the present invention will be described with reference to FIGS. 6 and 7. In FIGS. 6 and 7, like parts corresponding to those of FIGS. 2 to 4 are marked with the same references and therefore need not be described in detail.

In this embodiment, the magnetic circuits 15a and 15b mounted on the supporting member 12 to which the objective lens 11 is attached are improved, and the return magnetic paths of yokes are made asymmetrical relative to a straight line which passes the center of gravity of the movable portion of the objective lens drive device.

More specifically, according to this embodiment, the magnetic circuits 15a and 15b are formed of yokes 26a and 26b. Inside edge portions $26_{a1}$ and $26_{b1}$ and outside edge portions $26_{a2}$ and $26_{b2}$ of the yokes 26a and 26b are shaped substantially the same as the inside and outside edge portions $16_{a1}$, $16_{b1}$ and $16_{a2}$, $16_{b2}$ of the yokes 16a and 16b of the first embodiment. In that case, upper side wall portions $26_{a3}$ and $26_{b3}$ of the yokes 26a and 26b are displaced towards the rear.

If the thus arranged yokes 26a and 26b are secured to the arm portions 12b and 12c of the supporting member 12 similarly to the first embodiment, then the upper side wall portions $26_{a3}$ and $26_{b3}$ are coupled to the rear end upper surfaces of the arm portions 12b and 12c, whereby the supporting member 12 can be well balanced in the front to back direction. Therefore, without providing the balancer 18 between the rear ends of the arm portions 12b and 12c like the first embodiment, the center of gravity can be determined at sufficiently high accuracy. Also, the number of the assembly-processes can be reduced.

A third embodiment of the objective lens drive device according to the present invention will be described with reference to FIGS. 8 and 9. In this embodiment, a magnetic circuit is provided at the central portion (center of gravity portion) of the supporting member to which the objective lens is mounted.

In this embodiment, the objective lens 11 is attached to a supporting member 32, and this supporting member 32 is supported from the two sides thereof by a supporting member 33 so that it can be slidably translated in the up and down direction (focusing direction) and in the lateral direction (tracking direction). This supporting member 33 is constructed similarly as has been proposed by the assignee of the instant application (see Japanese Patent Application No. 1-101258). That is, the supporting member 33 is integrally composed of four arm members 33a, 33b, 33c and 33d which support at one side thereof the supporting member 32 from its two side surfaces and a coupling member 33e which couples the other sides of the four arm members 33a, 33b, 33c and 33d.

A magnetic circuit 35 is provided at the central portion of the supporting member 32 supported at the two side surfaces thereof by the supporting member 33. A yoke 36 of this magnetic circuit 35 is comprised of outside edge portions $36_{a1}$, $36_{a2}$, $36_{b1}$, $36_{b2}$, inside edge portions $36_{c1}$, $36_{c2}$, and magnet pieces 37a, 37b. More specifically, as shown in FIG. 9, the inside edge portions $36_{c1}$ and $36_{c2}$ are opposed to each other with a predetermined spacing between the outside edge portions $36_{a1}$, $36_{a2}$ and $36_{b1}$, $36_{b2}$. Also, the magnet pieces 37a and 37b are secured to the inside edge portions $36_{c1}$ and $36_{c2}$ with a predetermined spacing relative to the outside edge portions $36_{a1}$, $36_{a2}$ and $36_{b1}$, $36_{b2}$.

This yoke 36 is secured downwardly to a concave portion formed on the central portion of the supporting member 32 so as to oppose a drive coil 39 secured to the base plate side.

The drive coil 39 is formed by coupling tracking coils 41a, 41b, 41c and 41d of substantially square shapes to outer corner portions of a focusing coil 40 which is wound as a rectangular cylinder shape. When the yoke 36 is opposed to the drive coil 39, the inside edge portions $36_{c1}$ and $36_{c2}$ of the yoke 36 are inserted into the hollow portion of the focusing coil 40 together with the magnet pieces 37a and 37b. Also, the outside edge portions $36_{a1}$, $36_{a2}$ and $36_{b1}$, $36_{b2}$ of the yoke 36 are opposed to the tracking coils 41a, 41b, 41c and 41d on the outer surface of the focusing coil 4, thereby the magnetic drive section being constructed.

When a predetermined current is applied to the focusing coil and the tracking coil, a force in the up and down direction and a force in the lateral direction act on the supporting member 32 and the supporting member 32 is displaced in the direction parallel to the optical axis of the objective lens 11 and in the direction perpendicular to the optical axis of the objective lens 11 by the swinging movement of the supporting member 33, the focusing and the tracking of the laser beam being performed.

In this embodiment, since similar effects to those of the aforenoted embodiments are achieved and the magnetic circuit 35 formed of the yoke 36 and the magnet pieces 37a and 37b is provided at the gravity center portion of the supporting member 32 and hence the supporting member 32 can be displaced stably, the focusing and tracking controls of the laser beam by the objective lens 11 can be carried out more precisely.

Figure 10:
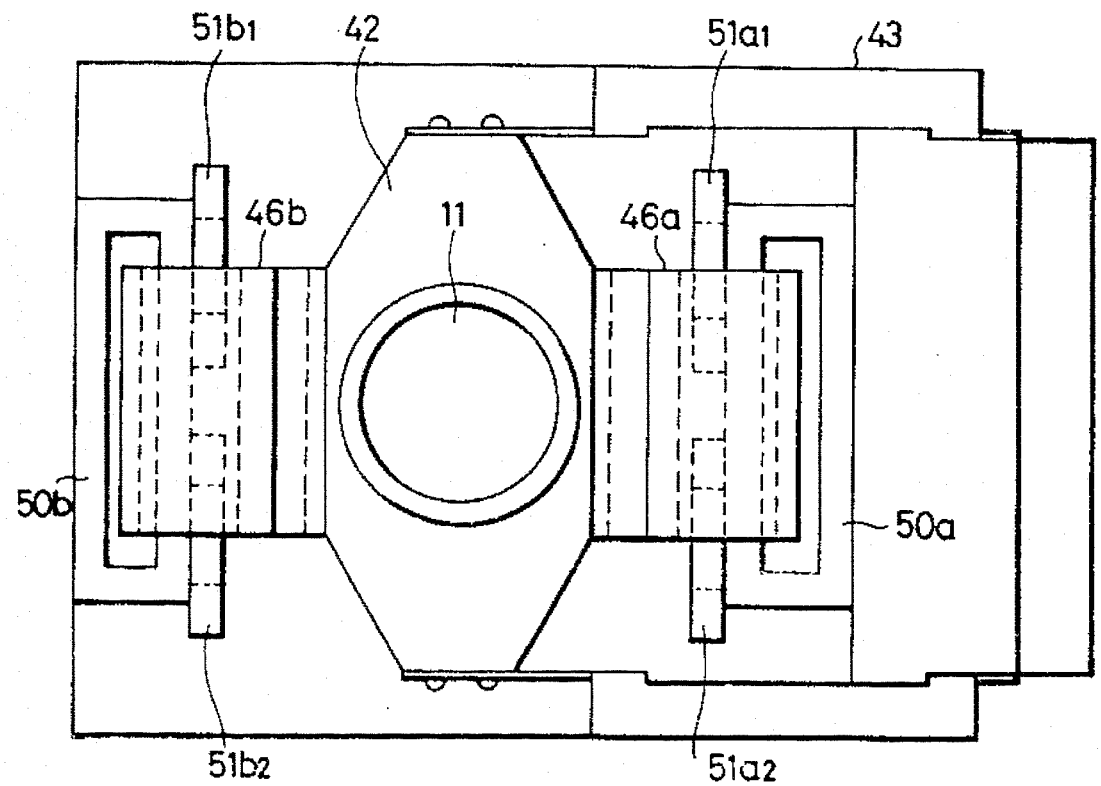
FIG. 10 is a plan view illustrating a fourth embodiment of the objective lens drive device according to the present invention.
Figure 11:
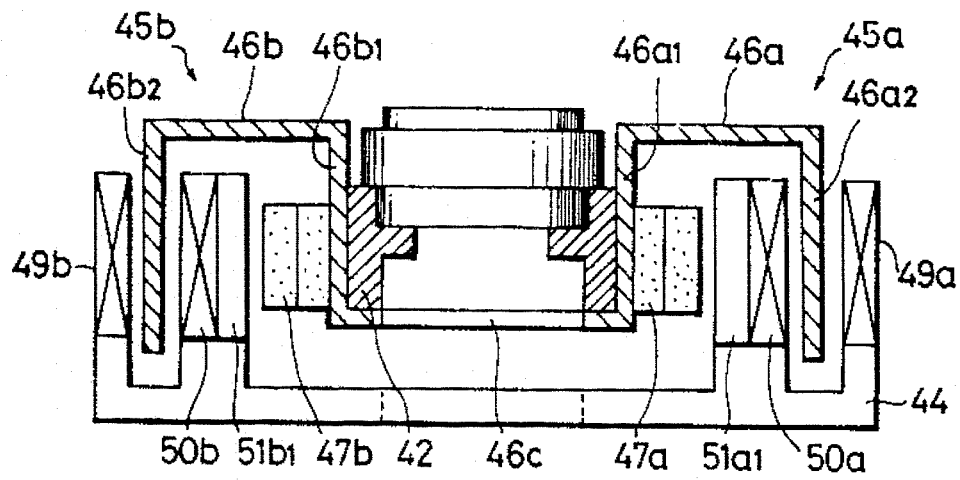
FIG. 11 is a transversal cross-sectional view of FIG. 10.

FIGS. 10 and 11 illustrate a fourth embodiment of the objective lens driving device according to the present invention. In this embodiment, left and right closed magnetic paths forming portions forming the magnetic circuit are formed continuously.

In this embodiment, as shown in FIG. 10, a supporting member 42 to which the objective lens 11 is attached can be translated in the up and down direction (focusing direction) and in the lateral direction (tracking direction) from the two side wall sides by a supporting member 43 which is formed similarly to the supporting member 33 shown in FIG. 8. Yokes 46a and 46b forming magnetic circuits 45a and 45b are molded by a magnetic plate-shaped material and secured to the supporting member 42.

As shown in FIG. 11, the yokes 46a and 46b are shaped as inverted U-letters and lower end edges of inside edge portions $46_{a1}$ and $46_{b1}$ thereof are coupled together by a horizontal surface portion 46c. The yokes 46a and 46b are secured at the horizontal surface portion 46c to the supporting member 42.

In the yokes 46a and 46b, magnet pieces 47a, 47b are secured to inside surfaces of the inside edge portions $46_{a1}$, $46_{b1}$ and outside edge portions $46_{a2}$, $46_{b2}$ thereof are inserted into drive coils 49a, 49b secured to a base plate 44.

Figure 3:
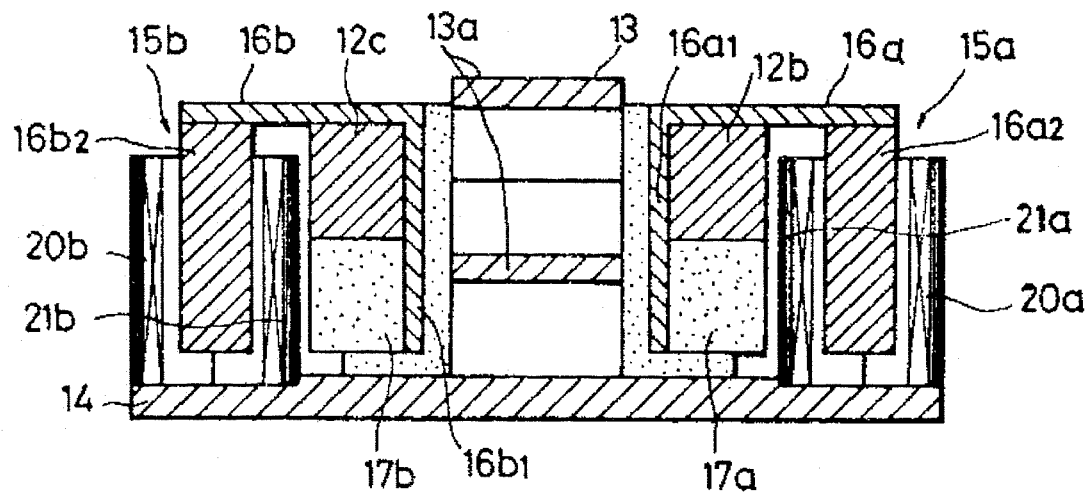
FIG. 3 is a transversal cross-sectional view of FIG. 1 and illustrating the objective lens drive device of the present invention in an enlarged scale.

More specifically, similarly to the first embodiment shown in FIGS. 2 to 4, the drive coils 49a and 49b are formed by coupling two pairs of tracking coils $51_{a1}$, $51_{a2}$ and $51_{b1}$, $51_{b2}$ wound in a substantially square shape to the inside surface sides of focusing coils 50a and 50b wound in a rectangular cylinder shape. When the outside edge portions $46_{a2}$, $46_{b2}$ of the yokes 46a, 46b are inserted into the hollow portions of the focusing coils 50a, 50b, the inside edge portions of the focusing coils 50a, 50b and the tracking coils $51_{a1}$, $51_{a2}$ and $51_{b1}$, $51_{b2}$ are positioned in the predetermined spacings between the outside edge portions $46_{a2}$, $46_{b2}$ and the magnetic members 47a, 47b of the inside edge portions $46_{a1}$, $46_{b1}$, thus the magnetic drive section being constructed.

When a predetermined current is supplied to the focusing coils and the tracking coils, similarly to the aforenoted embodiments, the force in the up and down direction and the force in the lateral direction act on the supporting member 42 so that the supporting member 42 is translated in the predetermined directions via the supporting member 43, thus allowing the objective lens 11 to perform the focusing and the tracking of the laser beam.

Also in this embodiment, similar effects to those of the aforenoted embodiments are achieved. Further, the left and right yokes 46a and 46b are molded by the press-molding process of the magnetic plate-shaped material or the like with ease, and the number of assembly parts can be reduced. Furthermore, the yokes 46a and 46b can be secured to the supporting member 42 with ease and the number of assembly processes can be reduced.

As set out above, according to the present invention, since the closed magnetic circuit is provided on the supporting member to which the objective lens is attached and the focusing and tracking coils are provided on the base plate side, heat generated by the focusing and tracking coils can be effectively radiated and the objective lens can be protected from being affected by the resultant heat.

Further, the scattering in balance of the supporting member can be suppressed from a mechanical standpoint, whereby the focusing and tracking of the laser beam by the objective lens can always be carried out accurately. This leads to the increase of reliability.

Furthermore, the lead wires of the coils can be led out with ease and the number of assembly parts can be reduced. Therefore, since the number of assembly processes can be reduced, it is possible to reduce the manufacturing cost of the objective lens drive device.

It should be noted that, although the present invention has been described with reference to the preferred embodiments, the present invention is not limited thereto and various modifications thereof are possible for those skilled in the art without departing from the scope of this invention.

We claim as our Invention:

1. An objective lens drive device comprising:

a base;

an objective lens having an optical axis;

a lens holder including a lens holding portion at a first end for holding said objective lens and a support portion at a second end opposite and distant from said lens holding portion at said first end;

a supporting member supporting said lens holder at said support portion thereof so that said lens holder is movable relative to said base in a first direction parallel to said optical axis and in a second direction perpendicular to said optical axis and including at least one arm connected to said lens holder and to said base;

a pair of cylindrical focusing coils mounted on said base in stationary relation thereto, each having an axis parallel to said optical axis and each being located away from said first end so as to be proximate said support portion of said lens holder at said second end, said optical axis of said objective lens being offset with respect to a central region between said focusing coils;

a pair of L-shaped first yoke members respectively mounted on opposite sides of said support portion of said lens holder;

a pair of magnets each respectively mounted on each of said pair of first yoke members so as to be offset from said optical axis of said objective lens;

a pair of second yoke members each respectively provided on each of said pair of first yoke members parallel to said magnets, each of said pair of second yoke members respectively being inserted within each of said pair of focusing coils proximate said support portion of said lens holder, one of said pair of L-shaped first yoke members and one of said pair of second yoke members being connected together to form a first yoke structure, the other of said L-shaped first yoke members and the other of said second yoke members being connected together to form a second yoke structure, and said first and second yoke structures being spaced apart from each other;

a pair of tracking coils each respectively mounted on each of said pair of focusing coils and respectively opposite each of said magnets, said optical axis of said objective lens being offset with respect to a central region between said pair of tracking coils; and a flexible printed circuit board laminated on said base between said base and said focusing and tracking coils, in stationary relation to said focusing and tracking coils, and electrically connected to said focusing and tracking coils.

2. An objective lens drive device according to claim 1, wherein said support portion of said lens holder includes a pair of arms parallel to each other and each of said magnets is arranged between a respective one of said pair of arms and said support portion of said lens holder.

3. An objective lens drive apparatus comprising:

a base;

an objective lens having an optical axis;

a lens holder including a lens holding portion at a first end for holding said objective lens and a support portion at a second end opposite and distant from said lens holding portion at said first end;

a supporting member supporting said support portion of said lens holder so that said lens holder is movable in a first direction parallel to said optical axis and in a second direction perpendicular to said optical axis and including at least one arm connected to said lens holder and to said base;

a cylindrical focusing coil mounted on said base in stationary relation thereto proximate said support portion of said lens holder and having an axis parallel to said optical axis, said focusing coil being spaced apart from said first end in a direction normal to said optical axis so such that said optical axis of said objective lens is offset from said axis of said focusing coil;

a pair of tracking coils mounted on said focusing coil so that said tracking coils are offset with respect to said optical axis of said objective lens;

a yoke member provided at the center of gravity of said lens holder proximate said support portion thereof and having a plurality of first arms and a pair of second arms, said second arms being opposed to each other and said first arms being opposed to said second arms;

a pair of magnets each respectively provided on each of said pair of second arms; and a flexible printed circuit board laminated on said base between said base and said focusing and tracking coils, in stationary relation to said focusing and tracking coils, and electrically connected to said focusing and tracking coils.

4. An objective lens drive apparatus according to claim 3, wherein said supporting member includes a metal plate and has a pair of arms and a connnecting portion connected to each of said arms, said connecting portion being fixed to said base member, and each of said arms having a portion connected to said support portion of said lens holder.

* * * * *